United States Patent
Courtier et al.

(10) Patent No.: US 11,767,098 B2
(45) Date of Patent: Sep. 26, 2023

(54) PROPELLER BLADE OR VANE FOR AN AIRCRAFT WITH PARTICULAR WEAVING OF A FIBRE PREFORM RECEIVING A BLADDER FILLED WITH A SHAPING FOAM

(71) Applicant: SAFRAN AIRCRAFT ENGINES, Paris (FR)

(72) Inventors: Vivien Mickaël Courtier, Moissy-Cramayel (FR); Dominique Gerhardt Mayhew, Moissy-Cramayel (FR); Adrien Louis Nicolas Laurenceau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 258 days.

(21) Appl. No.: 17/422,021

(22) PCT Filed: Jan. 3, 2020

(86) PCT No.: PCT/FR2020/050004
§ 371 (c)(1),
(2) Date: Jul. 9, 2021

(87) PCT Pub. No.: WO2020/148490
PCT Pub. Date: Jul. 23, 2020

(65) Prior Publication Data
US 2022/0097824 A1  Mar. 31, 2022

(30) Foreign Application Priority Data
Jan. 15, 2019  (FR) .................................... 1900349

(51) Int. Cl.
*B64C 11/26*    (2006.01)
*F01D 5/28*    (2006.01)
(Continued)

(52) U.S. Cl.
CPC ................. *B64C 11/26* (2013.01); *D03D 1/00* (2013.01); *D03D 11/02* (2013.01); *D03D 25/005* (2013.01); *D10B 2505/02* (2013.01)

(58) Field of Classification Search
CPC .............. B64C 11/26; F01D 5/28; D03D 1/00
See application file for complete search history.

(56) References Cited

U.S. PATENT DOCUMENTS

| 9,664,053 B2 | 5/2017 | Marshall et al. |
| 2013/0017093 A1 | 1/2013 | Coupe et al. |

(Continued)

FOREIGN PATENT DOCUMENTS

| CN | 102227525 A | 10/2011 |
| CN | 102666277 A | 9/2012 |

(Continued)

OTHER PUBLICATIONS

First Office Action as issued in Chinese Patent Application No. 202080009116.5, dated Feb. 22, 2022.

(Continued)

*Primary Examiner* — Long T Tran
(74) *Attorney, Agent, or Firm* — Pillsbury Winthrop Shaw Pittman LLP

(57) ABSTRACT

A blade includes a fibrous reinforcement having a three-dimensional weave densified by a matrix, the fibrous reinforcement including, in a single woven piece, a root and an aerodynamic profile part extending along a longitudinal direction between the root part and a blade tip portion and along a transverse direction between a leading and a trailing edge portion. The profile part includes first and second suction side and pressure side faces. The fibrous reinforcement includes a separation forming a housing inside the fibrous reinforcement, a bladder filled with a shaping foam being present in the housing. The separation extends over a (Continued)

separation zone inside the profile part of the fibrous reinforcement comprised between the root part and the blade tip portion in the longitudinal direction and between the leading and the trailing edge portion in the transverse direction. The separation opens to the outside of the profile part.

12 Claims, 8 Drawing Sheets

(51) Int. Cl.
*D03D 1/00* (2006.01)
*D03D 11/02* (2006.01)
*D03D 25/00* (2006.01)

(56) References Cited

U.S. PATENT DOCUMENTS

| | | | |
|---|---|---|---|
| 2013/0177422 A1* | 7/2013 | Bianchi | F01D 5/147 416/146 R |
| 2014/0133995 A1 | 5/2014 | Nagle et al. | |
| 2015/0226071 A1 | 8/2015 | Marshall et al. | |
| 2016/0159460 A1* | 6/2016 | Laurenceau | B29D 99/0025 264/103 |
| 2017/0341312 A1* | 11/2017 | Boschet | B29C 35/0272 |
| 2018/0127087 A1* | 5/2018 | Amat | D05B 85/006 |
| 2018/0127088 A1* | 5/2018 | Amat | B32B 5/18 |
| 2018/0128112 A1* | 5/2018 | Amat | B23P 15/04 |
| 2019/0217943 A1* | 7/2019 | Courtier | B29C 70/545 |

FOREIGN PATENT DOCUMENTS

| | | |
|---|---|---|
| CN | 103998721 A | 8/2014 |
| CN | 105358429 A | 2/2016 |
| EP | 1 526 285 A1 | 4/2005 |
| EP | 1 669 547 A2 | 6/2006 |
| EP | 3 019 398 A1 | 5/2016 |
| GB | 2315723 B | 6/1998 |
| WO | WO 2006/136755 A2 | 12/2006 |
| WO | WO 2012/001279 A1 | 1/2012 |
| WO | WO 2015/004362 A1 | 1/2015 |

OTHER PUBLICATIONS

International Search Report as issued in International Patent Application No. PCT/FR2020/050004, dated Mar. 20, 2020.

* cited by examiner

[Fig. 1]
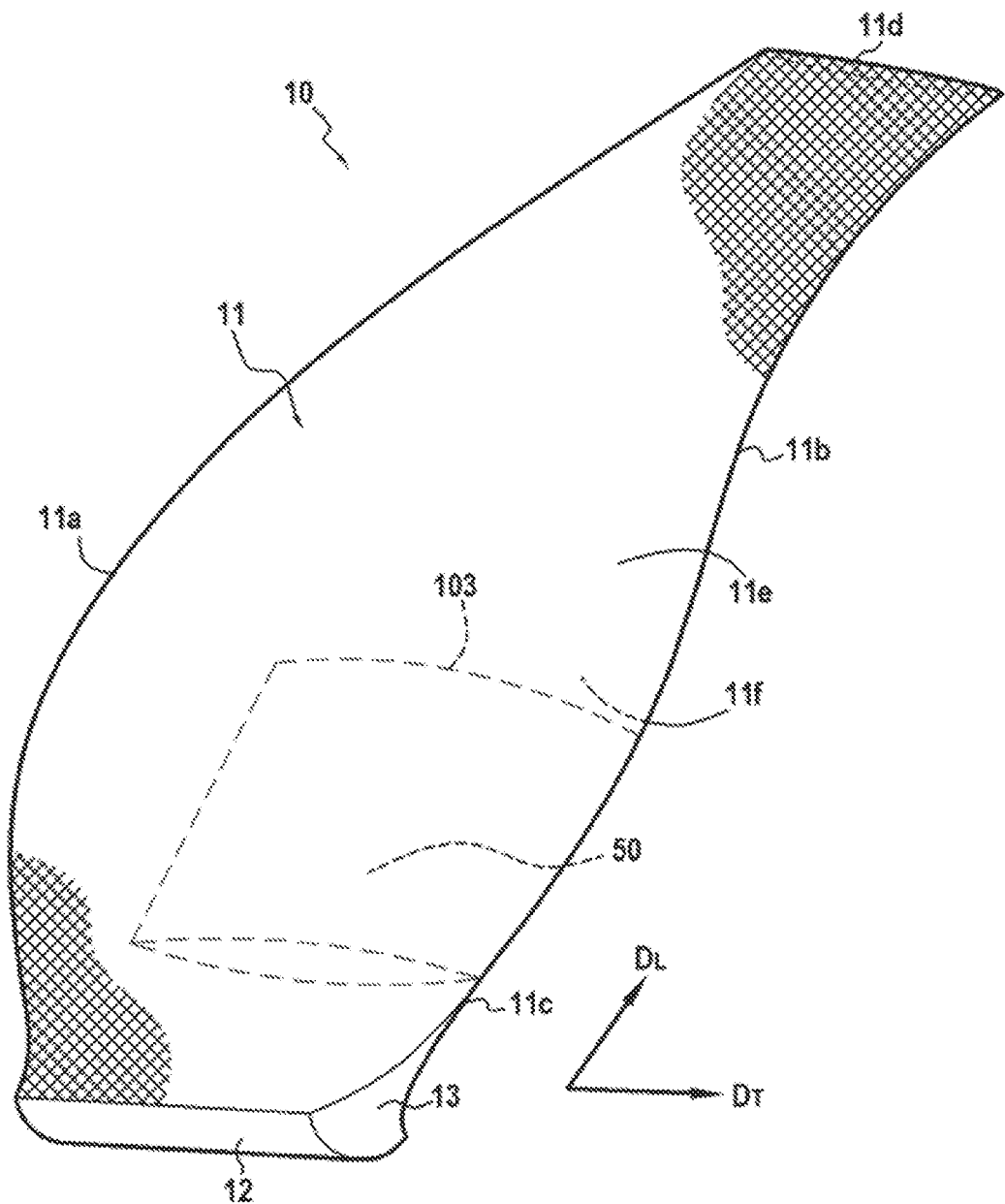

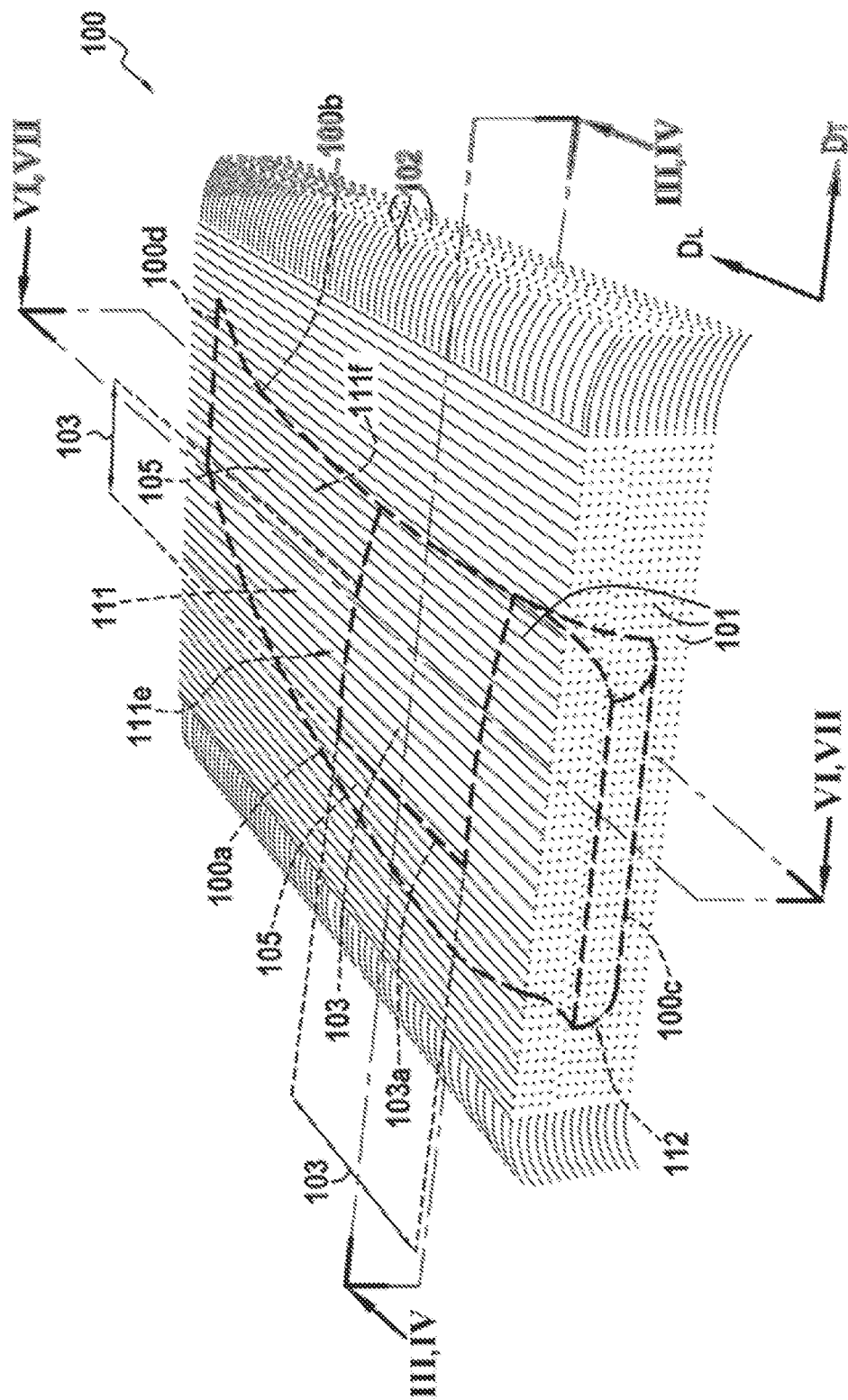
[Fig. 2]

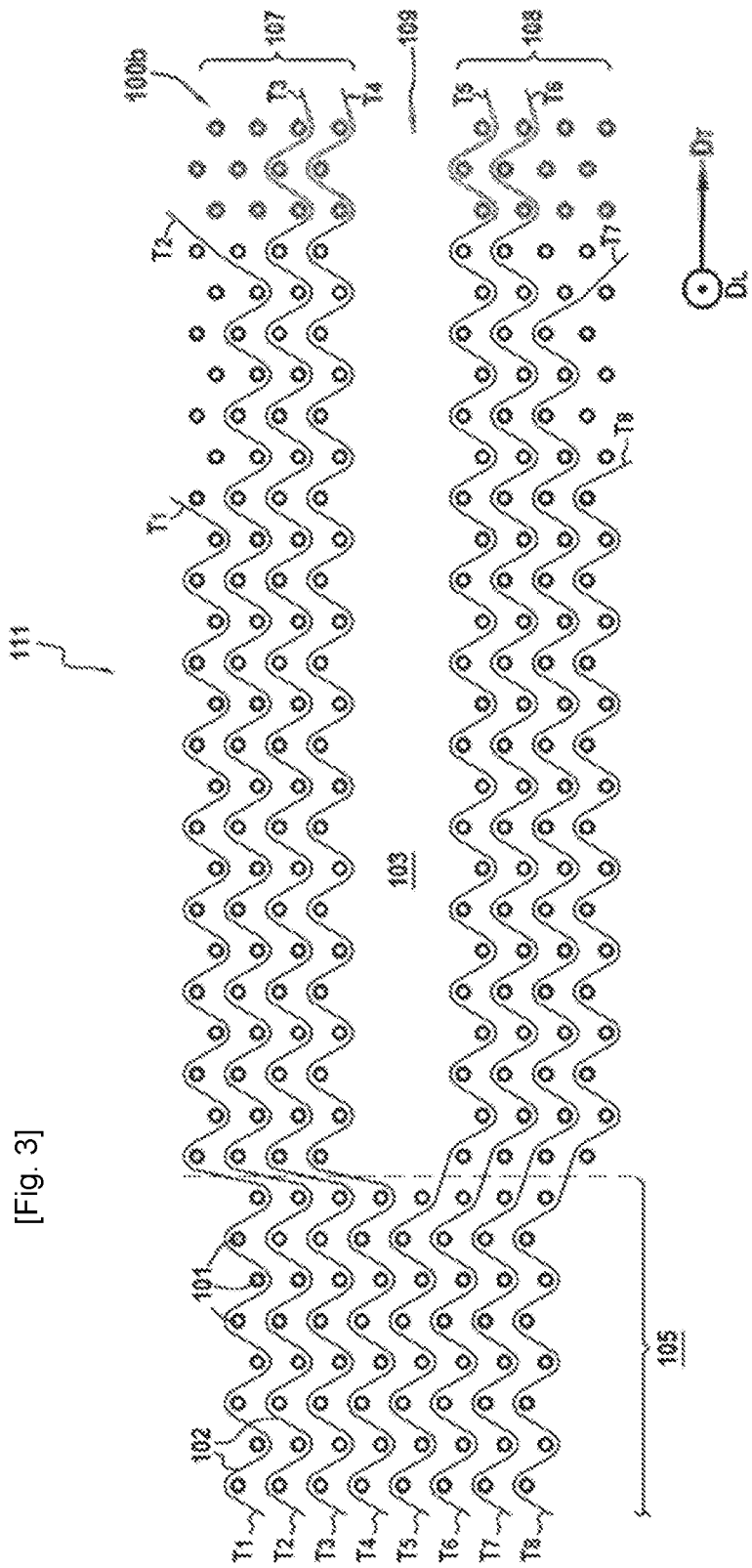

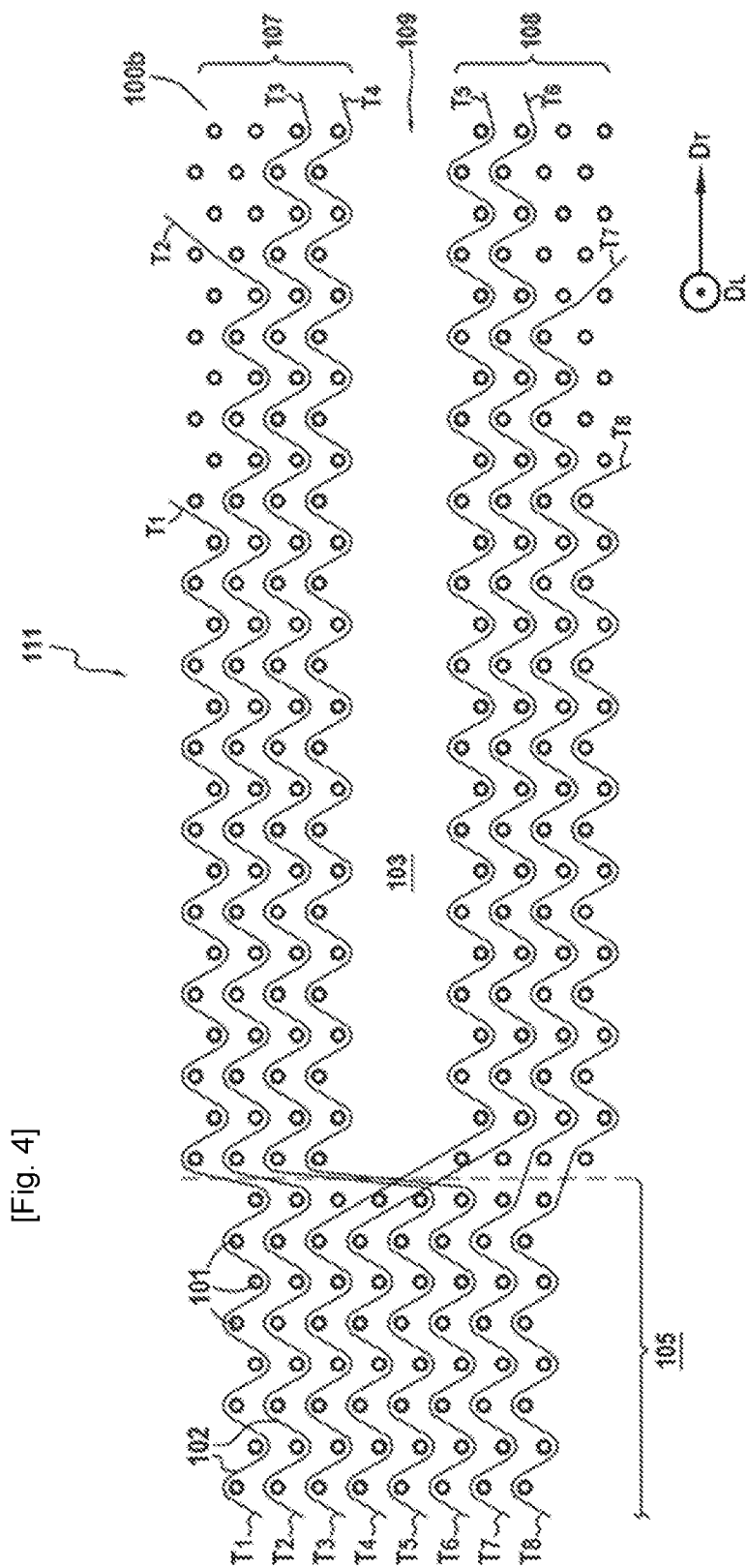
[Fig. 4]

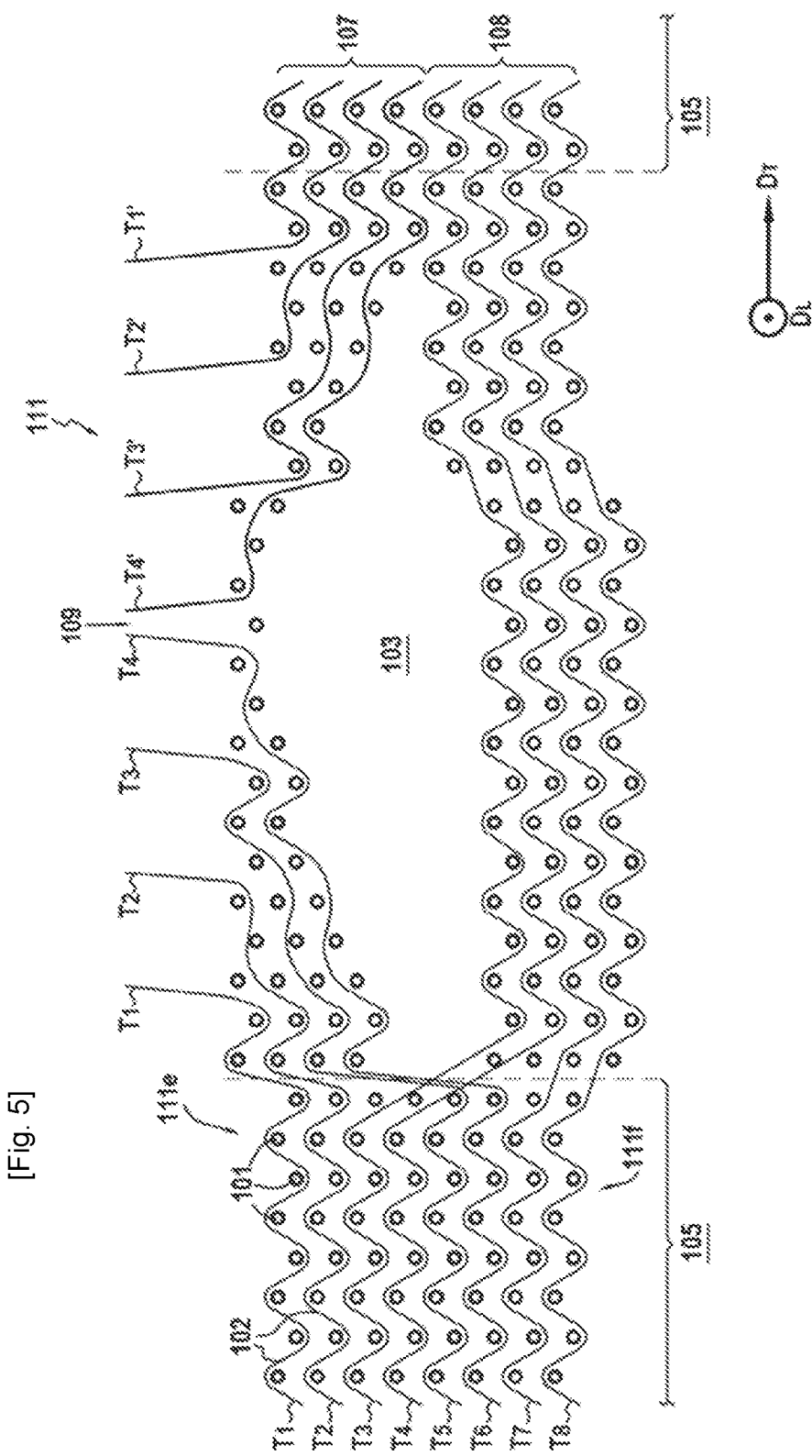
[Fig. 5]

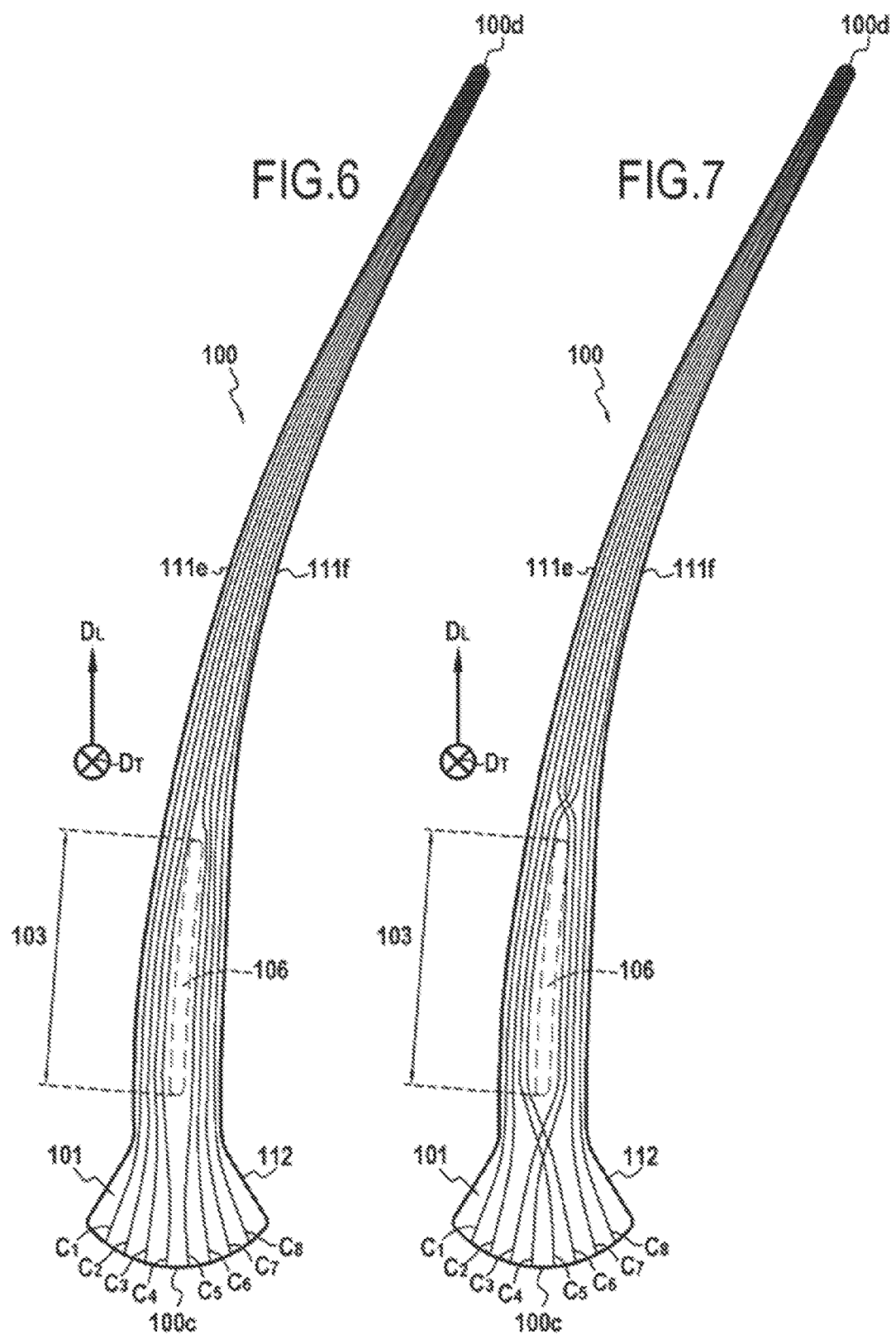

[Fig. 8]
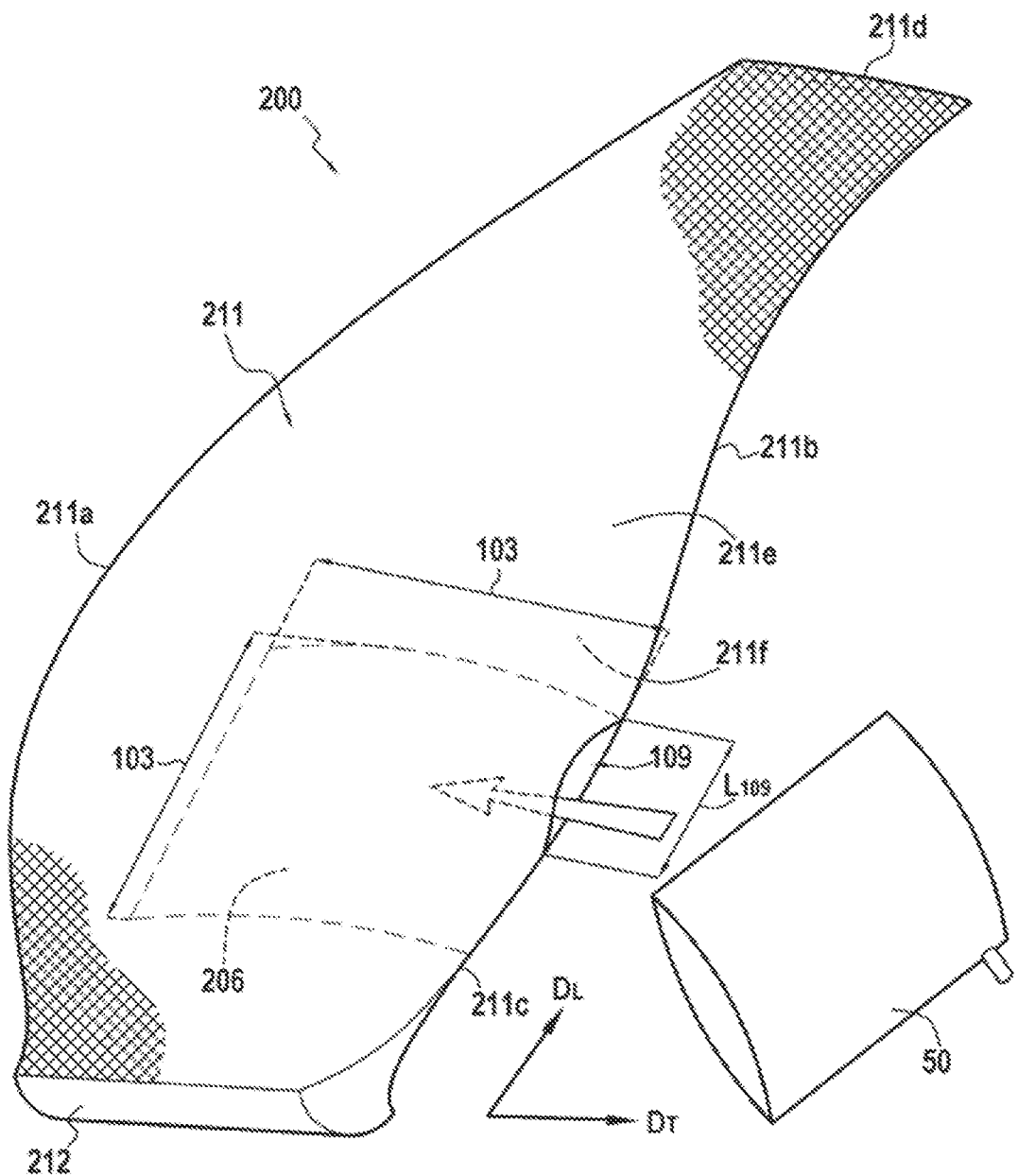

[Fig. 9]
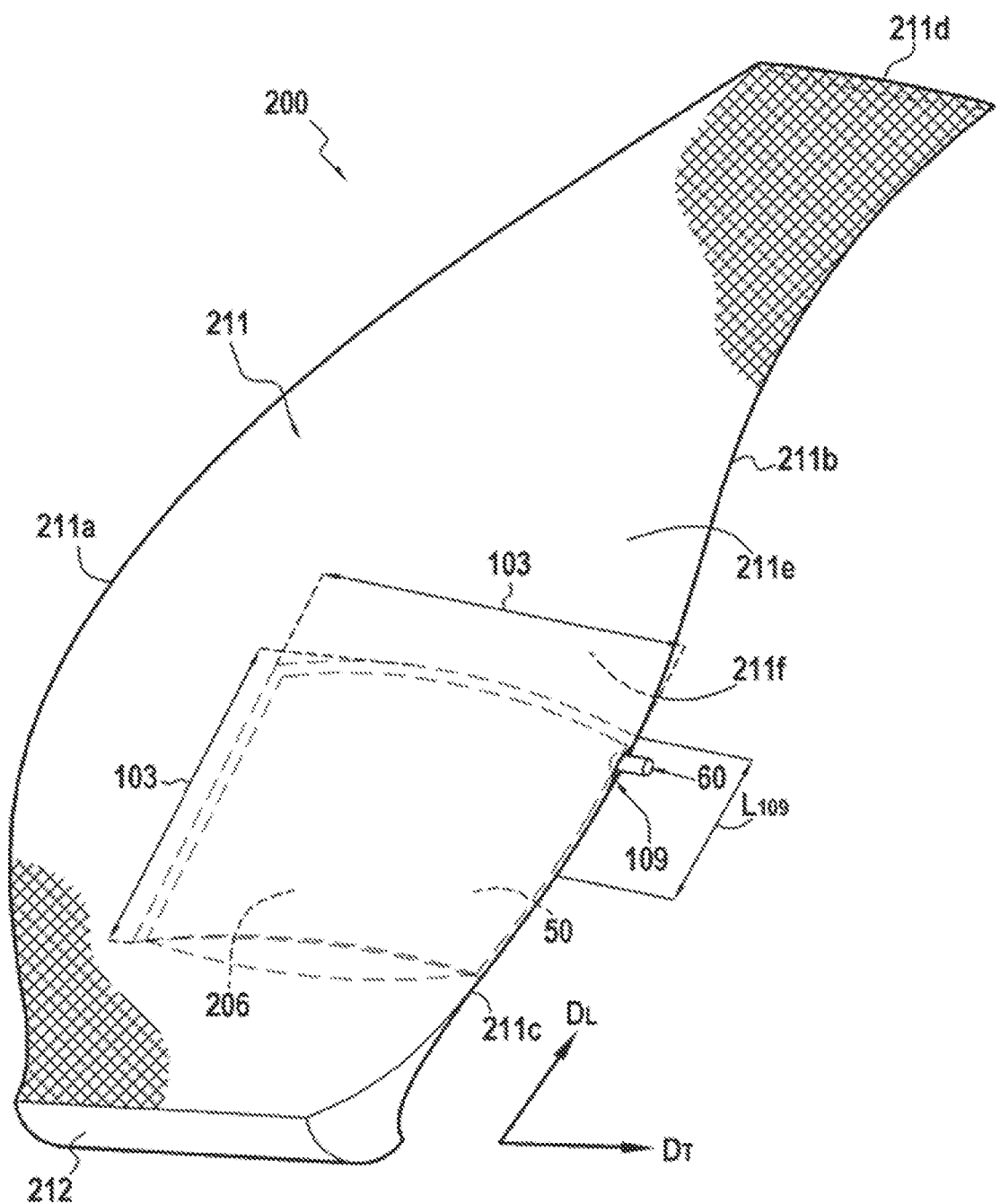

PROPELLER BLADE OR VANE FOR AN AIRCRAFT WITH PARTICULAR WEAVING OF A FIBRE PREFORM RECEIVING A BLADDER FILLED WITH A SHAPING FOAM

CROSS-REFERENCE TO RELATED APPLICATIONS

This application is the U.S. National Stage of PCT/FR2020/050004, filed Jan. 3, 2020, which in turn claims priority to French patent application number 1900349 filed Jan. 15, 2019. The content of these applications are incorporated herein by reference in their entireties.

TECHNICAL FIELD

The present invention applies to the field of propeller blades or vanes for aircraft such as those present in turboprops.

PRIOR ART

Propeller blades or vanes for turboprops are generally made of metallic material. Although propeller blades or vanes of metallic material have good mechanical resistance, they have, however, the disadvantage of having a relatively high mass.

In order to obtain lighter propeller blades or vanes, it is known to produce propeller blades of composite material, i.e. by making parts with a structure having a fibrous reinforcement and a resin matrix.

Documents US 2013/0017093 and WO 2012/001279 describe the production of a propeller vane based on a fibrous structure with an aerodynamic profile inside which is introduced a part of a longeron, one end of the longeron being continued by a convex portion intended to form the root of the propeller vane. The fibrous structure, which is made in a single piece by three-dimensional weaving, includes a separation zone allowing forming a housing inside the fibrous structure into which is inserted a part of the longeron, the root of the vane being formed by the convex portion of the longeron which extends outside the fibrous structure with the aerodynamic profile.

The propeller van thus obtained has both a lightened overall mass and high mechanical resistance due to the presence in the skin of a composite material structure (fibrous reinforcement densified by a matrix).

However, the retention in position of the of longeron applied in the fibrous structure, and consequently of the root of the propeller vane, can be awkward in certain cases, such as for example when the vane is subjected to large mechanical loads, impacts or shocks.

DISCLOSURE OF THE INVENTION

It is therefore desirable to be able to propose a solution for the production of aircraft propeller blades or vanes of the type described above, but which have increased mechanical resistance, in particular as regards retention in position of the blade or vane root with respect to the fibrous structure with an aerodynamic profile.

To this end, according to the invention, an aircraft propeller blade or vane is proposed comprising a fibrous reinforcement having a three-dimensional weave between a plurality of warp yarn layers extending along a longitudinal direction and a plurality of weft yarn layers extending along a transverse direction, the fibrous reinforcement being densified by a matrix, the fibrous reinforcement comprising, in a single woven piece, a root part and an aerodynamic profile part extending along the longitudinal direction between the root part and a blade tip portion and along the transverse direction between a leading edge portion and a trailing edge portion, the aerodynamic profile part including first and second suction side and pressure side faces, the fibrous reinforcement including a separation forming a housing inside said fibrous reinforcement, propeller blade or vane in which a bladder filled with a shaping foam is present in the housing, and in which the separation extends over a separation zone inside the aerodynamic profile part of the fibrous reinforcement inside the aerodynamic profile part of the fibrous reinforcement comprised between the root part and the blade tip portion in the longitudinal direction and between the leading edge portion and the trailing edge portion in the transverse direction, the separation further opening to the outside of the aerodynamic profile part of the fibrous reinforcement.

By thus producing a fibrous reinforcement in which a root part is integrally formed, i.e. woven in a single piece, with an aerodynamic profile part, a perfect retention in position of the attachment parts (support and root) of the propeller blade or vane with respect to the aerodynamic profile is ensured. In fact, even in the event of mechanical loads (impacts, shocks) at the aerodynamic profile of the propeller blade or vane, there is not risk of movement of the root part with respect to the aerodynamic profile part because they are interlinked by continuously woven parts of the reinforcement.

According to a first aspect of the propeller blade or vane of the invention, a first yarn part of the plurality of weft yarn layers crosses a second yarn part of the plurality of weft yarn layers in a zone of the fibrous reinforcement located in proximity to the separation along the transverse direction, the yarns of the first yarn part of the plurality of weft yarn layers extending on one side of the separation along the transverse direction, while the yarns of the second yarn part of the plurality of weft yarn layers extend from the other side of the separation along the transverse direction.

The crossing of weft yarns upstream and/or downstream of the separation zone along the transverse direction allows improving the strength of the fibrous blank in the separation zone as well as the retention of the shaping piece inside the fibrous reinforcement.

According to a second aspect of the propeller blade or vane of the invention, the first yarn part of the weft yarn layers crosses a first time the second yarn part of the weft yarn layers in a zone of the fibrous reinforcement located upstream of the separation along the transverse direction and crosses a second time the second yarn part of the weft yarn layers in a zone of the fibrous reinforcement located downstream of the separation along the transverse direction.

According to a third aspect of the propeller blade or vane of the invention, a first yarn part of the plurality of warp yarn layers crosses a second yarn part of the plurality of warp yarn layers in a zone of the fibrous reinforcement located in proximity to the separation along the longitudinal direction, the yarns of the first yarn part of the plurality of warp yarn layers extending on one side of the separation along the longitudinal direction, while the yarns of the second yarn part of the plurality of warp yarn layers extend from the other side of the of the separation along the longitudinal direction.

The crossing of the warp yarns upstream and/or downstream of the separation zone along the longitudinal direction allows improving the strength of the fibrous blank in the separation zone as well as the retention of the shaping piece inside the fibrous reinforcement.

According to a fifth aspect of the propeller blade or vane of the invention, the first yarn part of the warp yarn layers crosses a first time the second yarn part of the warp yarn layers in a zone of the fibrous reinforcement located upstream of the separation along the longitudinal direction and crosses a second time the second yarn part of the warp yarn layers in a zone of the fibrous reinforcement located downstream of the separation along the longitudinal direction.

The invention also has as its object an aeronautical engine comprising a plurality of vanes according to the invention.

The invention also relates to an aircraft comprising at least one engine according to the invention.

Finally, the present invention has as its object a method for manufacturing an aircraft propeller blade or vane comprising at least:
producing, by three-dimensional weaving between a plurality of warp yarn layers and a plurality of weft yarn layers, a fibrous structure in a single piece, the structure comprising a root part and an aerodynamic profile part extending along a longitudinal direction between the root part and a blade tip portion and along a transverse direction between a leading edge portion and a trailing edge portion, said structure including a separation forming a housing inside the fibrous structure,
shaping the fibrous structure by introducing a bladder into the housing of the fibrous blank and by filling the bladder with a shaping foam,
densifying the preform using a matrix to obtain one of a propeller blade or vane having a fibrous reinforcement consisting of said preform and densified by the matrix,
method in which the separation extends over a zone inside the aerodynamic profile part of the fibrous reinforcement comprised between the root part and the blade tip portion in the longitudinal direction and between the leading edge portion and the trailing edge portion in the transverse direction, the separation further opening to the outside of the aerodynamic profile part of the fibrous reinforcement.

The use of a bladder for shaping the fibrous structure is advantageous in that it allows minimizing the necessary opening for gaining access to the housing inside the fibrous structure. In fact, the opening need only have a dimension sufficient to allow the introduction of the bladder, this then being filled with a foam so as to occupy the entire volume of the housing, the bladder than taking the desired shape to confer its shape to the aerodynamic profile. The impact of the opening of the housing on the mechanical strength of the reinforcement of the propeller blade or vane is thus reduced.

According to a first aspect of the method of the invention, a first yarn part of the plurality of weft yarn layers crosses a second yarn part of the plurality of weft yarn layers in a zone of the fibrous reinforcement located in proximity to the separation along the transverse direction, the yarns of the first yarn part of the plurality of weft yarn layers extending on one side of the separation along the transverse direction while the yarns of the second yarn part of the plurality of weft yarn layers extend on the other side of the separation along the transverse direction.

According to a second aspect of the method of the invention, the first yarn part of the weft yarn layers crosses a first time the second yarn part of the weft yarn layers in a zone of the fibrous reinforcement located upstream of the separation along the transverse direction, and crosses a second time the second yarn part of the weft yarn layers in a zone of the fibrous reinforcement located downstream of the separation along the transverse direction.

According to a third aspect of the method of the invention, a first yarn part of the plurality of warp yarn layers crosses a second yarn part of the plurality of warp yarn layers in a zone of the fibrous reinforcement located in proximity to the separation along the longitudinal direction, the yarns of the first yarn part of the plurality of warp yarn layers extending on one side of the separation along the longitudinal direction, while the yarns of the second yarn part of the plurality of warp yarn layers extend on the other side of the separation along the longitudinal direction.

According to a fourth aspect of the method according to the invention, the first yarn part of the warp yarn layers crosses a first time the second yarn part of the warp yarn layers in a zone of the fibrous reinforcement located upstream of the separation along the longitudinal direction and in which the first yarn part of the warp yarn layers crosses a second time the second yarn part of the warp yarn layers in a zone of the fibrous reinforcement located downstream of the separation along the longitudinal direction.

BRIEF DESCRIPTION OF THE DRAWINGS

FIG. 1 is a perspective view of a blade conforming to an embodiment of the invention, FIG. 2 is a schematic view illustrating the 3D weaving of a fibrous blank for the manufacture of the blade of FIG. 1, FIG. 3 is a partial section view at larger scale in the weft direction of a set of yarn layers showing the formation of a separation zone in the blank of FIG. 2 opening at the trailing edge portion, FIG. 4 is a partial section view at larger scale in the weft direction of a set of yarn layers showing a variant embodiment of the separation zone in the blank of FIG. 2 opening at the trailing edge portion, FIG. 5 is a partial section view at larger scale in the weft direction of a set of yarn layers showing the formation of a separation zone in the blank of FIG. 2 opening at a face of the aerodynamic profile blank, FIG. 6 is a section view in the warp direction of a set of yarn layers showing the formation of a separation zone in the blank of FIG. 2, FIG. 7 is a section view in the warp direction of a set of yarn layers showing a variant embodiment of the separation zone in the blank of FIG. 2, FIG. 8 is a perspective view showing the insertion of a bladder into a fibrous structure coming from the fibrous blank of FIG. 2.

FIG. 9 is a perspective view showing the filling of the bladder of FIG. 8 with a shaping foam.

DESCRIPTION OF THE EMBODIMENTS

The invention applies generally to different types of propeller blades or vanes used in aircraft engines. The invention finds advantageous, but not exclusive, application in propeller blades or vanes of large dimensions which, due to their size, have a large mass having a significant impact on the overall mass of the engine of the aircraft. The blade according to the invention can in particular constitute a blade for shrouded rotors such as fan blades or a blade for unshrouded rotors such as in aeronautical engines called "open rotor."

FIG. 1 shows a blade 10 intended to be mounted on an airplane turboprop which comprises an aerodynamic profile 11 intended to form the aerodynamic part of the vane, a root 12 formed by a part of greater thickness, for example with a cross section in the shape of a bulb, continued by a support 13. The aerodynamic profile 11 comprises a suction side face 11e and a pressure side face 11f and has, in transverse section, a curved profile with variable thickness between its leading edge 11a and its trailing edge 11b along a transverse direction $D_T$. The aerodynamic profile 11 extends, along a longitudinal direction $D_L$, between a lower edge 11c and an upper edge 11d. The root 12 extends along the transverse direction $D_T$ over a length less than the length of the lower edge 11c of the aerodynamic profile 11.

FIG. 2 shows very schematically a fibrous structure blank 100 intended to form the fibrous preform of the blade to be produced.

The fibrous structure blank 100 is obtained, as illustrated schematically in FIG. 2, by three-dimensional (3D) weaving, produced in known fashion by means of a loom of the jacquard type on which a bundle of warp yarns 101 has been arranged, or strands in a plurality of layers, each of several hundred yarns, the warp yarns being linked by weft yarns 102. The fibrous structure blank 100 is woven in a single piece, the blank extending in a longitudinal direction $D_L$ between a lower part 100c and an upper part 100d and in a transverse direction $D_T$ between a front edge 100a and a rear edge 100b, the blank comprising an aerodynamic profile blank 111 defining two faces 111e and 111f intended to form respectively the suction side and pressure side faces of the blade, and a blank with a convex portion 112 intended to subsequently form a blade root and extending outside the aerodynamic profile blank 111 along the longitudinal direction $D_L$ and set back from the front and rear edges 100a and 100b along the transverse direction $D_T$.

In the example illustrated, the 3D weave is an "interlock" pattern weave. What is meant by "interlock" weave is a weave pattern in which each weft yarn layer interlinks several warp yarn layers with all the yarns of the same weft column having the same movement in the plane of the weave pattern.

Other types of known three-dimensional weave could be used, as in particular those described in document WO 2006/136755, the content of which is incorporated here by reference. This document describes in particular the production by weaving, in a single piece, of fibrous reinforcement structures for pieces such as blades having a first type of weave pattern in the core and a second type of weave pattern in the skin, which allow conferring both the expected mechanical and aerodynamic properties for this type of piece.

The fibrous blank according to the invention can be woven in particular from carbon fiber or ceramic yarns such as silicon carbide.

As the weaving of the fibrous blank with variable thickness and width progresses, a certain number of warp yarns are not woven, which allows defining the desired continuously variable contour and thickness of the blank 100. One example of evolving 3D weaving, allowing in particular varying the thickness of the blank between a first edge intended to form the leading edge and a second edge with a smaller thickness and intended to form the trailing edge is described in document EP 1 526 285, the content of which is incorporated here by reference.

During weaving, a separation 103 is produced inside the fibrous blank 100 between two successive warp yarn layers, the separation 103 extending over a separation zone defined by a contour 103a separating said separation zone from a link zone 105 in the fibrous blank. The separation 103 allows providing a housing 206 (FIG. 8) with the dimensions of a shaping part 50 intended to be placed inside the fibrous blank 100 for the purpose of the shaping of the vane preform (FIG. 9).

One 3D weaving mode of the blank 100 with an interlock weave pattern is shown schematically by FIG. 3. FIG. 3 is a partial enlarged view of a warp plane section in the aerodynamic profile blank 111 of the blank 100 including the separation 103 (section III-III in FIG. 2). In this example, the blank 100 includes 8 warp yarn layers 101 extending substantially in the longitudinal direction $D_L$. In FIG. 3, the 8 warp yarn layers are linked by weft yarns $T_1$ to $T_8$ in the link zone 105 of the fibrous blank 100, the weft yarns extending substantially in the transverse direction $D_T$. At the separation 103, the 4 warp yarn layers 101 forming the set of yarn layers 107 are interlinked by 4 weft yarns $T_1$ to $T_4$, just as the 4 warp yarn layers forming the set of yarn layers 108 are linked by 4 weft yarns $T_5$ et $T_8$. In other words, the fact that the weft yarns $T_1$ to $T_4$ do not extend in the yarn layers 108 and that the weft yarns $T_5$ to $T_8$ do not extend in the yarn layers 107 ensures the separation 103 which separates from one another the sets of warp yarn layers 107 and 108.

At the separation 103 of the weaving example presented in FIG. 3, the weft yarns $T_1$ to $T_4$, on the one hand, and the weft yarns $T_5$ to $T_8$, on the other hand, are respectively arranged on either side of the separation 103, the weft yarns $T_1$ to $T_4$ linking the four first warp yarn layers forming the set of yarn layers 107 and the weft yarns $T_5$ to $T_8$ linking the four last warp yarn layers forming the set of yarn layers 108. In the example described here, the weft yarns $T_1$ and $T_2$, on the one hand, and the weft yarns $T_7$ and $T_8$, on the other hand, are taken out upstream of the rear edge 100b in order to manage the thickness reduction in this part of the aerodynamic profile.

Still in this weaving example presented in FIG. 3, the separation 103 extends until the rear edge 100b of the fibrous blank intended to form the trailing edge 11b of the blade 10 (FIG. 1). Here the separation opens outside the aerodynamic profile blank 111 at the rear edge 100b in which it forms an opening 109 for the introduction of a shaping piece as described hereafter. According to one variant embodiment, the separation 103 can open at the front edge 100a of the fibrous blank 100 intended to form the leading edge 11a of the blade 10.

According to a variant embodiment illustrated in FIG. 4 (section IV-IV in FIG. 2), a first yarn part of the weft yarn layers crosses a second yarn part of the weft yarn layers in a zone of the aerodynamic profile blank 111 of the fibrous blank located in proximity to the separation zone 104 along the transverse direction $D_T$, the yarns of the first weft yarn part 102 extending from one side of the separation 103 along the transverse direction $D_T$ while the yarns of the second yarn part of the plurality of weft yarn layers 102 extend on the other side of the separation 103 along the transverse direction $D_T$. More precisely, one or more weft yarns 102 linking warp yarn layers forming the set of yarn layers 107 in the link zone 105 are used to link the warp yarn layers forming the set of yarn layers 108 in the link zone 105, and conversely. In the example illustrated in FIG. 4, the weft yarns $T_3$ and $T_4$, linking warp yarn layers 101 of the set of yarn layers 107 in the link zone 105 are deflected at the beginning or upstream of the separation 103 along the transverse direction $D_T$ to link warp yarn layers 101 of the set of yarn layers 108. Likewise, the weft yarns $T_5$ and $T_6$, linking warp yarn layers 101 of the set of yarn layers 108 in the link zone 105 are deflected at the beginning or upstream of the separation 103 in the transverse direction $D_T$ to link warp yarn layers 101 of the set of yarn layers 107. The crossing of the weft yarns $T_3$ and $T_4$ and of the weft yarns $T_5$ and $T_6$ upstream of the separation 103 along the transverse direction $D_T$ allows improving the strength of the fibrous blank in the separation zone.

In the weaving example presented in FIG. 4, the separation 103 extends until the rear edge 100b of the fibrous blank intended to form the trailing edge 11b of the blade 10 (FIG. 1). Here the separation opens outside the aerodynamic profile blank 111 at the rear edge 100b in which it forms an opening 109 for the introduction of a shaping piece as described hereafter. According to a variant embodiment, the separation 103 can open at the front edge 100a of the fibrous blank 100 intended to form the leading edge 11a of the blade 10.

FIG. 5 illustrates an enlarged partial view of another weaving variant according to a warp plane section in a part of the blank 100 including the separation 103. In this variant, the separation zone 103 opens on the face 111e of the aerodynamic profile blank 111 intended to form the suction side face 11e of the blade 10. In this example of a variant, the blank 100 comprises 8 warp yarn layers 101 extending substantially in the longitudinal direction $D_L$. In FIG. 5, the 8 warp yarn layers are linked by weft yarns $T_1$ to $T_8$ in the link zones 105 of the fibrous blank 100, the weft yarns extending substantially in the transverse direction $D_T$. At the beginning of the separation 103, the 4 warp yarn layers 101 forming the set of yarn layers 107 are interlinked by 4 weft yarns $T_1$ to $T_4$, likewise the 4 warp yarn layers forming the set of yarn layers 108 are linked by 4 weft yarns $T_5$ to $T_8$, the weft yarns $T_1$ to $T_4$, on the one hand, and the weft yarns $T_5$ to $T_8$, on the other hand, being respectively located on either side of the separation 103.

In order to cause the separation 103 to open on the face 111e of the aerodynamic profile blank 111, the weft yarns $T_1$ to $T_4$ are progressively taken out of the blank to form an opening 109, then the weft yarns $T_{1'}$ to $T_{4'}$ are progressively reintroduced into the blank to produce the end of the separation 103 and the second link zone 105 which extends to the rear edge 100b. An opening 109 is thus formed allowing the introduction of a shaping element into the housing formed by the separation 103 inside the aerodynamic profile blank. The same removals of weft yarns as described previously can be produced with the weft yarns $T_5$ and $T_8$ while reintroducing similar weft yarns after the opening in order to cause the separation 103 to open on the face 111f of the aerodynamic profile blank intended for form the pressure side face 11f of the blade 10.

Regarding the warp yarns 101 in the fibrous blank 100, these can, according to one aspect of the invention, follow the same trajectory from the convex portion 112 to the upper part 100d while passing on either side of the separation 103 as shown in FIG. 6 for the warp yarns $C_1$ to $C_8$ (section VI-VI in FIG. 2).

According to another aspect of the invention illustrated in FIG. 7 (section VII-VII in FIG. 2), a first yarn part of the warp yarn layers 101, here yarns $C_3$ and $C_4$, crosses a second yarn part of the warp yarn layers 101, here yarns $C_5$ and $C_6$, in a zone of the fibrous blank 100 located at the beginning or upstream of the separation 104 along the longitudinal direction $D_L$, the yarns $C_3$ and $C_4$ of the first yarn part of the layers of warp yarns extending on one side of the separation zone 104 along the longitudinal direction $D_L$ while the yarns $C_5$ and $C_6$ of the second yarn part of the layers of warp yarns extend on the other side of the separation zone 104 along the longitudinal direction $D_L$. Then, the yarns $C_3$ and $C_4$ again cross the yarns $C_5$ and $C_6$ in a zone of the fibrous blank 100 located at the end or downstream of the separation zone 104 along the longitudinal direction $D_L$. The crossing of the warp yarns $C_3$ and $C_4$ and of the weft yarns $C_5$ and $C_6$ upstream and/or downstream of the separation zone 104 along the longitudinal direction $D_L$ allows improving the strength of the fibrous blank in the separation zone. According to a variant embodiment, a part of the warp yarns can intersect only upstream or downstream of the separation zone 104 along the longitudinal direction $D_L$.

In the example described here, the separation 103 is produced between two adjacent columns of weft yarns. In all the columns of the weft yarns, the separation is also produced along two adjacent columns of warp yarns. However, depending on the shape of the separation zone that it is desired to obtain, the separation according to the invention can evolve. In this case, the separation can be produced between different columns of weft yarns along the transverse direction $D_T$ and/or the longitudinal direction $D_L$.

According to yet another variant embodiment, the separation can open at the upper part 100d of the aerodynamic profile blank 111 intended to form the upper edge 11d of the blade 10. In this case, the separation, such as for example the separation illustrated in FIG. 6, is continued until the upper part 110d along the longitudinal direction $D_L$.

Once the fibrous structure 100 is woven, the cutting out of the floated yarns present outside the woven mass (phase called "trimming") is carried out. Then, the contour of the flat preform is cut out, using a water jet for example.

What is then obtained as illustrated in FIG. 8, is a fibrous structure 200 woven in a single piece and having an aerodynamic profile 211 and a convex portion 212, the aerodynamic profile 211 extending in the longitudinal direction $D_L$ between a lower end 211c and an upper end 211d and in the transverse direction $D_T$ between a front edge or leading edge portion 211a and a rear edge or trailing edge portion 211b intended to form respectively the leading and trailing edges of the blade. The aerodynamic profile 211 includes two faces 211e and 211f intended to form respectively the suction side and pressure side faces of the blade. The fibrous structure 200 includes the separation 103 extending between the front and rear edges 211a and 211d of the aerodynamic profile 211 along the transverse direction $D_T$ and between the lower and upper ends 211c and 211d of the aerodynamic profile 211 along the longitudinal direction $D_L$. The convex portion 212 located outside the aerodynamic profile is intended to form the root 12 of the blade 10.

The separation 103 defines an internal housing 206 inside the profile 211, accessible via the opening 109 present on the side of the rear edges or trailing edge portion 211b. In FIG. 8, a bladder 50 is introduced into the internal housing 206 via the opening 109. The opening 109 does not necessarily extend over the entire length of the separation as in the example described here where the size of the opening 109 has been optimized in that it extends along the longitudinal direction $D_L$ over a minimum length $L_{109}$ allowing the introduction of the bladder 50 into the housing 206 by its smallest dimension or by its deformation, the operator using suitable tooling for the placement of the shaping piece into the housing.

The shaping of the fibrous structure 200 is followed by the filling of the bladder 50 with a shaping foam 60 as illustrated in FIG. 9. The foam 60 corresponds to an expandable foam. Despite its flexibility the bladder 50, once inflated with the foam 60, occupies the volume and takes the shape of the housing 206 so as to define the aerodynamic profile of the propeller blade or vane. The foam is held under pressure during the time necessary for its hardening.

Once the shaping foam 60 is hardened, the densification of the fibrous blade preform is carried out. The opening 109 can be closed by sewing prior to densification.

The hardening of the foam can be carried out prior to the densification of the preform or at the same time.

The densification of the fibrous preform consists of filling in the porosity of the preform, in all or part of its volume, using the material constituting the matrix.

The matrix of the composite material can be obtained in a manner known per se using the wet process.

The wet process consists of impregnating the preform with a liquid composition containing an organic precursor of the material of the matrix. The organic precursor usually appears in the form of a polymer, such as a resin, possibly diluted in a solvent. The preform is placed in a mold which can be sealed shut with a housing having the shape of the final molded piece and possibly having in particular a helical shape corresponding to the final shape of the blade. Then the mold is closed and the liquid matrix precursor (a resin for example) is injected into the entire housing to impregnate the entire fibrous part of the preform.

The transformation of the organic matrix precursor, namely its polymerization, is accomplished by heat treatment, generally by heating the mold, after elimination of the possible solvent and cross-linking the polymer, the preform always being held in the mold having a shape corresponding to that of the blade. The organic matrix can in particular be obtained from epoxy resins, such as the high performance epoxy resin sold under catalog number PR 520 by the CYTEC company, or liquid precursors of carbon or ceramic matrices.

In the case of the formation of a carbon or ceramic matrix, the heat treatment consists of pyrolyzing the organic precursor to transform the organic matrix into a carbon or ceramic matrix depending on the precursor used and the pyrolysis conditions. By way of an example, liquid carbon precursors can be resins with a relatively high coke rate, such as phenolic resins, while liquid ceramic precursors, particularly for SiC, can be resins of the polycarbosilane (PCS) or polytitanocarbosilane (PTCS) or polysilazane (PSZ) type. Several consecutive cycles, from impregnation to heat treatment, can be carried out to arrive at the desired degree of densification.

According to one aspect of the invention, the densification of the fibrous preform can be accomplished by the well-known method of transfer molding called RTM ("Resin Transfer Molding"). In conformity with the RTM method, the fibrous preform is placed in a mold having the external shape of the vane. A thermosetting resin is injected into the internal space defined between the piece of rigid material and the mold and which comprises the fibrous preform. A pressure gradient is generally established in this internal space between the location where the resin is injected and the openings for allowing the latter to escape in order to control and optimize the impregnation of the preform by the resin.

The resin used can, for example, be an epoxy resin. Resins suited to the RTM methods are well known. They preferably have a low viscosity to facilitate their injection into the fibers. The selection of the temperature class and/or the chemical nature of the resin is determined depending on the thermomechanical loads to which the piece must be subjected. Once the resin is injected into the entire reinforcement, its polymerization by heat treatment is carried out in conformity with the RTM method.

After injection and polymerization, the piece is removed from the mold. In the end, the piece is trimmed to remove excess resin and the chamfers are machined. No other machining is necessary because, as the piece is molded, it satisfies the required dimensions. A blade 10 made of composite material is then obtained, as shown in FIG. 1.

The invention claimed is:

1. An aircraft propeller blade or vane comprising a fibrous reinforcement having a three-dimensional weave between a plurality of warp yarn layers and a plurality of weft yarn layers, the fibrous reinforcement being densified by a matrix, the fibrous reinforcement comprising, in a single woven piece, a root part and an aerodynamic profile part extending along a longitudinal direction between the root part and a blade tip portion and along a transverse direction between a leading edge portion and a trailing edge portion, the aerodynamic profile part including first and second suction side and pressure side faces, the fibrous reinforcement including a separation forming a housing inside said fibrous reinforcement, propeller blade or vane wherein a bladder filled with a shaping foam is present in the housing, and wherein the separation extends over a separation zone inside the aerodynamic profile part of the fibrous reinforcement comprised between the root part and the blade tip portion in the longitudinal direction and between the leading edge portion and the trailing edge portion in the transverse direction, the separation further opening to the outside of the aerodynamic profile part of the fibrous reinforcement.

2. The propeller blade or vane according to claim 1, wherein a first yarn part of the plurality of weft yarn layers crosses a second yarn part of the plurality of warp yarn layers in a zone of the fibrous reinforcement located in proximity to the separation along the transverse direction, the yarns of the first yarn part of the plurality of weft yarn layers extending on one side of the separation along the transverse direction while the yarns of the second yarn part of the plurality of weft yarn layers extend from the other side of the separation along the transverse direction.

3. The propeller blade or vane according to claim 2, wherein the first yarn part of the weft yarn layers crosses a first time the second yarn part of the weft yarn layers in a zone of the fibrous reinforcement located upstream of the separation along the transverse direction and wherein the first yarn part of the weft yarn layers crosses a second time the second yarn part of the weft yarn layers in a zone of the fibrous reinforcement located downstream of the separation along the transverse direction.

4. The propeller blade or vane according to claim 1, wherein a first yarn part of the plurality of warp yarn layers crosses a second yarn part of the plurality of warp yarn layers in a zone of the fibrous reinforcement located in proximity to the separation along the longitudinal direction, the yarns of the first yarn part of the plurality of warp yarn layers extending on one side of the separation along the longitudinal direction, while the yarns of the second yarn part of the plurality of warp yarn layers extend from the other side of the separation along the longitudinal direction.

5. The propeller blade or vane according to claim 4, wherein the first yarn part of the warp yarn layers crosses a first time the second yarn part of the warp yarn layers in a zone of the fibrous reinforcement located upstream of the separation along the longitudinal direction and wherein the first yarn part of the warp yarn layers crosses a second time the second yarn part of the warp yarn layers in a zone of the fibrous reinforcement located downstream of the separation along the longitudinal direction.

6. An aeronautical engine comprising a plurality of blades according to claim 1.

7. An aircraft comprising at least one engine according to claim 6.

8. A method for manufacturing an aircraft propeller blade or vane comprising:
- producing, by three-dimensional weaving between a plurality of warp yarn layers and a plurality of weft yarns layers, a fibrous structure in a single piece, the structure comprising a root part and an aerodynamic profile part extending along a longitudinal direction between the root part and a blade tip portion and along a transverse direction between a leading edge portion and a trailing edge portion, said structure including a separation forming a housing inside the fibrous structure,
- shaping the fibrous structure by introducing a bladder into the housing of the fibrous structure and by filling the bladder with a shaping foam,
- densifying the preform using a matrix to obtain one of a propeller blade or vane having a fibrous reinforcement consisting of said preform and densified by the matrix,
- wherein the separation extends over a separation zone inside the aerodynamic profile part of the fibrous reinforcement comprised between the root part and the blade tip portion in the longitudinal direction and between the leading edge portion and the trailing edge portion in the transverse direction, the separation opening to the outside of the aerodynamic profile part of the fibrous reinforcement.

9. The method according to claim 8, wherein a first yarn part of the plurality of weft yarn layers crosses a second yarn part of the plurality of weft yarn layers in a zone of the fibrous reinforcement located in proximity to the separation along the transverse direction, the yarns of the first yarn part of the plurality of weft yarn layers extending on one side of the separation along the transverse direction while the yarns of the second yarn part of the plurality of weft yarn layers extend from the other side of the separation along the transverse direction.

10. The method according to claim 9, wherein the first yarn part of the weft yarn layers crosses a first time the second yarn part of the weft yarn layers in a zone of the fibrous reinforcement located upstream of the separation along the transverse direction and wherein the first yarn part of the weft yarn layers crosses a second time the second yarn part of the weft yarn layers in a zone of the fibrous reinforcement located downstream of the separation along the transverse direction.

11. The method according to claim 8, wherein a first yarn part of the plurality of warp yarn layers crosses a second yarn part of the plurality of warp yarn layers in a zone of the fibrous reinforcement located in proximity to the separation along the longitudinal direction, the yarns of the first yarn part of the plurality of warp yarn layers extending on one side of the separation along the longitudinal direction, while the yarns of the second yarn part of the plurality of warp yarn layers extend on the other side of the separation along the longitudinal direction.

12. The method according to claim 11, wherein the first yarn part of the warp yarn layers crosses a first time the second yarn part of the warp yarn layers in a zone of the fibrous reinforcement located upstream of the separation along the longitudinal direction and in which the first yarn part of the warp yarn layers crosses a second time the second yarn part of the warp yarn layers in a zone of the fibrous reinforcement located downstream of the separation along the longitudinal direction.

* * * * *